United States Patent [19]

Itoh

[11] 4,142,473

[45] Mar. 6, 1979

[54] MICRO PROCESSOR CONTROLLED SEWING MACHINE PATTERN GENERATOR

[76] Inventor: Akihiko Itoh, 4638 Deelane St., Torrance, Calif. 90503

[21] Appl. No.: 826,070

[22] Filed: Aug. 19, 1977

[30] Foreign Application Priority Data

Aug. 26, 1976 [JP] Japan .................................. 51-101806

[51] Int. Cl.$^2$ .............................................. D05B 3/02
[52] U.S. Cl. ................................................. 112/158 E
[58] Field of Search .......... 112/158 E, 121.11, 121.12, 112/275, 277; 318/567, 568

[56] References Cited

U.S. PATENT DOCUMENTS

| | | | |
|---|---|---|---|
| 3,847,100 | 11/1974 | Garron | 112/158 E |
| 3,872,808 | 3/1975 | Wurst | 112/158 E |
| 3,984,745 | 10/1976 | Minalga | 112/158 E X |
| 4,016,821 | 4/1977 | Minalga | 112/158 E |
| 4,051,794 | 10/1977 | Herzer et al. | 112/121.12 |
| 4,085,691 | 4/1978 | Coughenour et al. | 112/158 E |

Primary Examiner—Peter Nerbun
Attorney, Agent, or Firm—Robert E. Cunha

[57] ABSTRACT

A computerized controller for a sewing machine is described. A plurality of patterns is stored in the memory. These patterns may be sewn into the fabric as single patterns, as a group of patterns or as a continuing series of identical groups of patterns. The patterns themselves are also variable in position, size, length and height. The basis of this system is a micro-computer or microprocessor, for accessing stored pattern data for controlling the fabric and needle motion, for manipulating said pattern data and for output of said data to the sewing machine servo circuits in the predetermined order desired.

4 Claims, 10 Drawing Figures

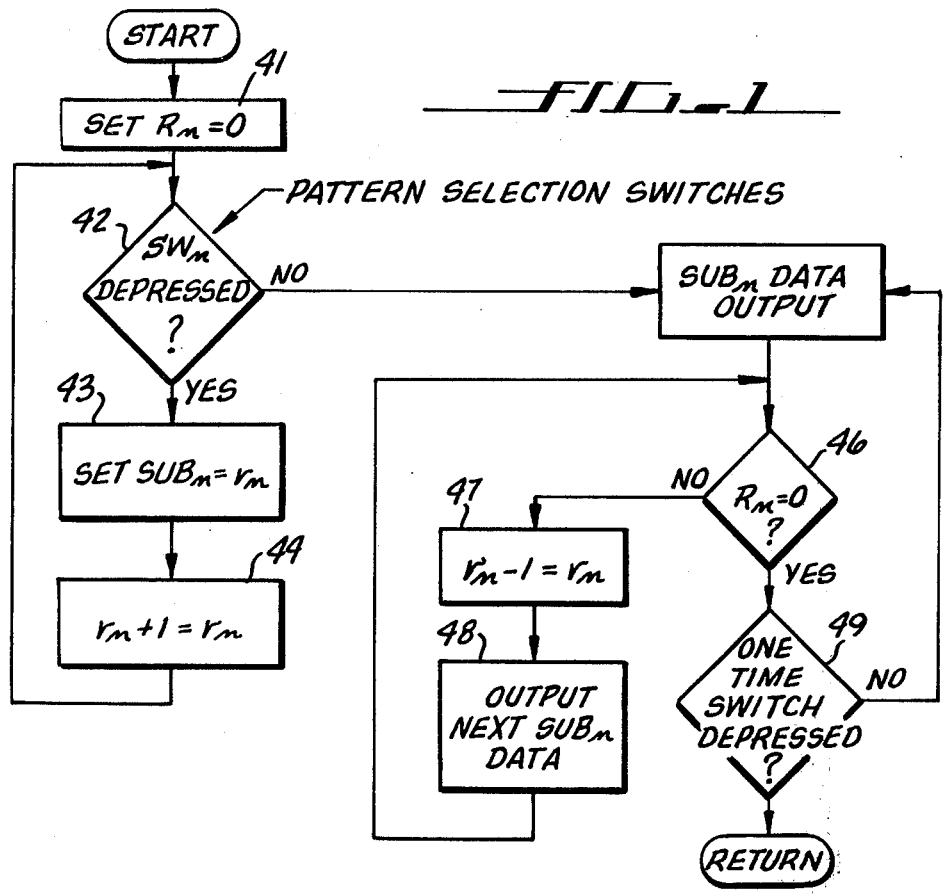
FIG_1
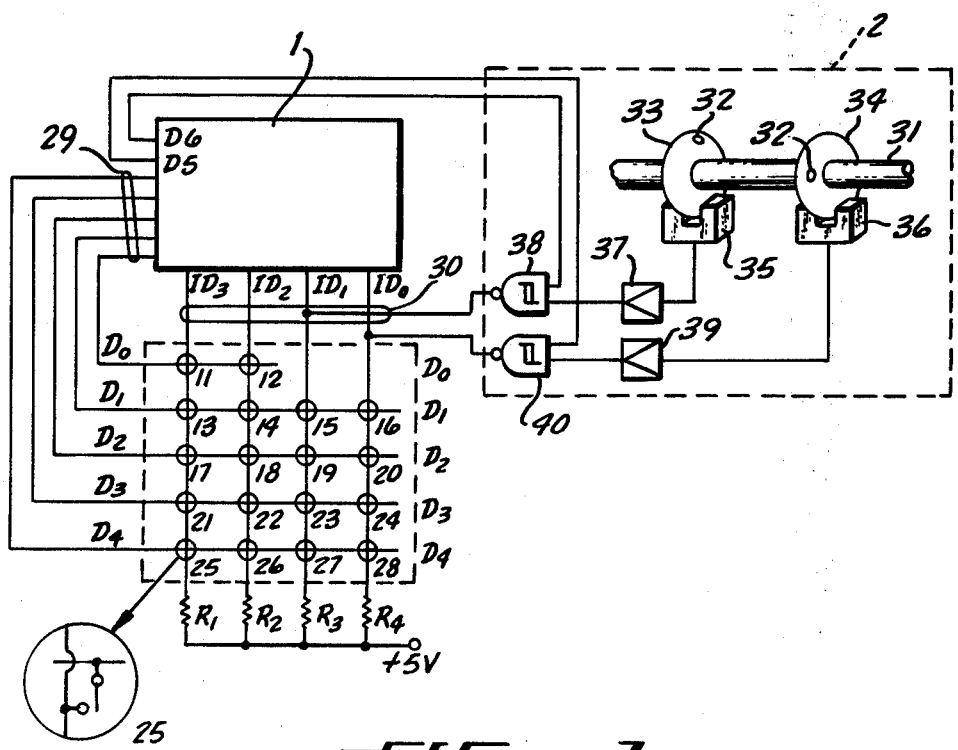
FIG_2

MICRO PROCESSOR CONTROLLED SEWING MACHINE PATTERN GENERATOR

BACKGROUND OF THE INVENTION

The invention apparatus comprises an electrical circuit for controlling a sewing machine and more particularly comprises a microprocessor for accessing stored pattern data in main memory and using said patterns to control the sewing machine fabric and needle mechanisms.

Sewing machines comprising mechanical cam arrangements for sewing patterns are available but are not reliable due to dust and friction problems normally associated with complicated cam linkages.

An electrical controller is described in U.S. Pat. Nos. 3,872,808 and 3,885,956. However, these machines are limited to the sewing of single patterns of unvarying size and shape. A more flexible machine offering a greater range of pattern forms and an automatic selection of patterns is needed.

SUMMARY OF THE INVENTION

The invention apparatus comprises a microprocessor and a plurality of pattern switches, the pattern corresponding to each switch being stored in a main memory. The microprocessor interrogates said matrix of pattern switches and outputs the appropriate pattern of fabric and needle motions to the needle and fabric servo circuits. If a plurality of switches are depressed, the microprocessor reads out and stores the switch numbers in the order that they were depressed and delivers the corresponding patterns to the needle and fabric transport mechanism. If a "one time38 switch is not depressed, the sequence of patterns will be repeated until stopped manually. The arithmetic logic unit is adapted to manipulate the data patterns before they are output allowing the basic patterns to be modified in position, shape and size prior to being used.

The resultant sewing machine equipped with the controller described herein has great flexibility and convenience and may be used to particular advantage by professionals in the garment industry.

BRIEF DESCRIPTION OF THE DRAWINGS

FIG. 1 is a flow chart of the basic system operation;

FIG. 2 is a schematic diagram of the switch matrix and synchronizer;

DETAILED DESCRIPTION OF THE INVENTION

Figure 3:
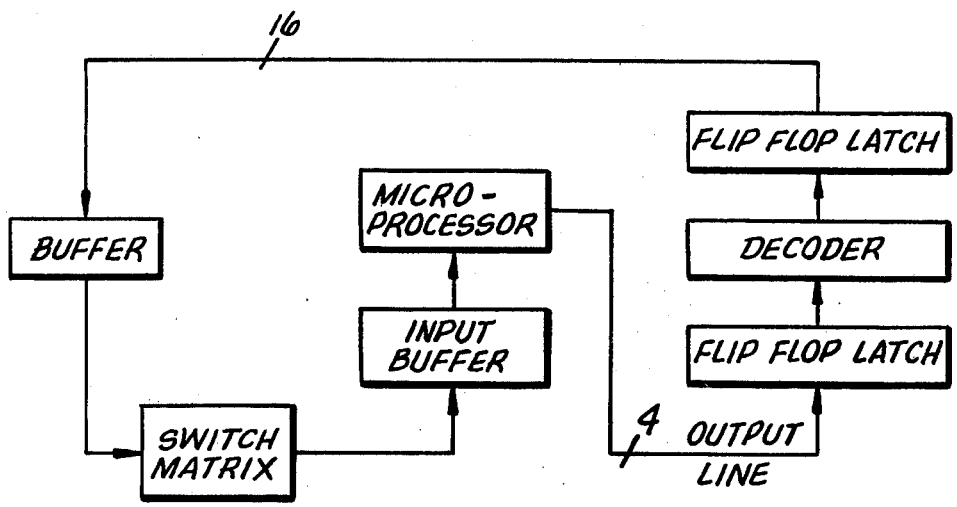
FIG. 3 is an alternate embodiment of the microprocessor and switch matrix.

The apparatus described herein comprises a computerized circuit for controlling a sewing machine in making various patterns, and controls both the fabric transport mechanism and the needle lateral motion for use of the data output patterns. The major differences between this and prior systems is that this system can produce any number of patterns in order, repetitively.

A flow chart of the overall system operation is shown in FIG. 1. The system is initialized by setting the pattern counter, Rn to zero. At step 42, a test is made to see if any one of a plurality of pattern switches is depressed. If one is, the pattern counter is increased by one. The loop comprising step 42, 43 and 44 will be continued until all switch depressions have been counted and stored.

The program then executes the loop comprising steps 45, 46, 47 and 48, outputting the data patterns in order. If the "one time " switch is not depressed, the data output sequence will be repeated cyclically. Otherwise, the sub-routine is completed. The "one time" switch is a switch additional to the pattern switches in the matrix and is read in an identical fashion.

FIG. 2 shows the main electronic control devices for making the various patterns. The microprocessor 1 may be any commercial device, a TI 1000 Series of the Texas Instruments Company of Richardson, Texas, the Int'l 8080 Series of InTel Co. of Sacramento, Calif., the M 6800 Series of Motorola Semi Conductor of Phoenix, Ariz., and PPS 4, PPS 8 of Rockwell International of Anaheim, Calif., etc. are examples, and is used to access the various patterns in main memory (not shown in this figure) to process said patterns and to output them to the sewing machine fabric transport and needle position servo loops.

The synchronization section 2 provides timing signals to the processor. It is constructed of two plates. One plate 33 is for timing the needle motion and the other, 34, is for timing the fabric transport mechanism. Each plate has a small hole 32 which allows light to pass through between a light emitter and a light detecting pair 35 or 36 after amplification in amplifiers 37 or 39, ultimately to generate timing pulses at schmitt triggers 38 and 40. Processor lines D5 and D6 interrogate these lines and use the trigger outputs at input pins $ID_o$ and $ID_1$ to synchronize the data pattern output to the needle and fabric motion.

Both the schmitt trigger lines and the matrix $ID_1$ and $ID_o$ columns are tied together. The computer differentiates by interrogating the circuit either through the $D_5$ and $D_6$ lines or through the $D_o$ through $D_4$ lines.

It is necessary for the fabric motion to cease before the needle penetrates the fabric. Therefore note that the needle and fabric holes 32 of FIG. 2 are separated by 90 degrees.

Matrix points 11 through 28 each correspond to a pattern switch which makes contact when an associated button is depressed. Each row is interrogated by lines $D_o$ through $D_4$ and the input pattern data is applied to the computer at pins $ID_o$ through $ID_3$.

FIG. 2 is limited to a maximum of twenty patterns which would result if five rows of four columns were used for the switch matrix. An alternate apparatus configuration is shown in FIG. 3. In this case four output lines can be decoded onto sixteen row lines. Assuming four columns, the maximum number of patterns could be sixty-four. The flip-flop latches and buffers could be used only if these circuits are not provided as part of the microprocessor or decoder clips.

Figure 4:
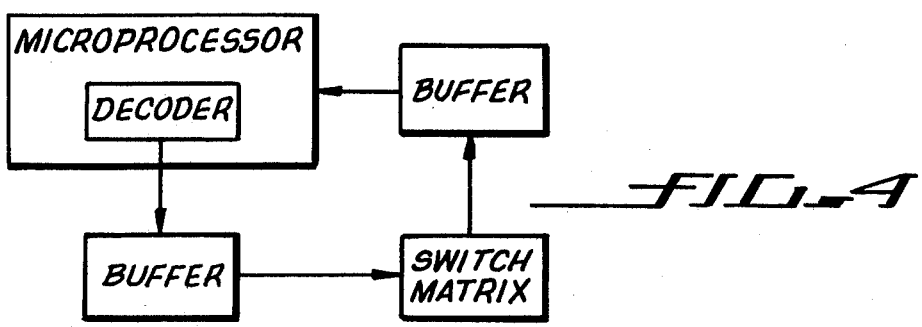
FIG. 4 is another alternate embodiment of the microprocessor and switch matrix.

FIG. 4 is an alternate embodiment where the microprocessor itself comprises a decoder.

Figure 5:
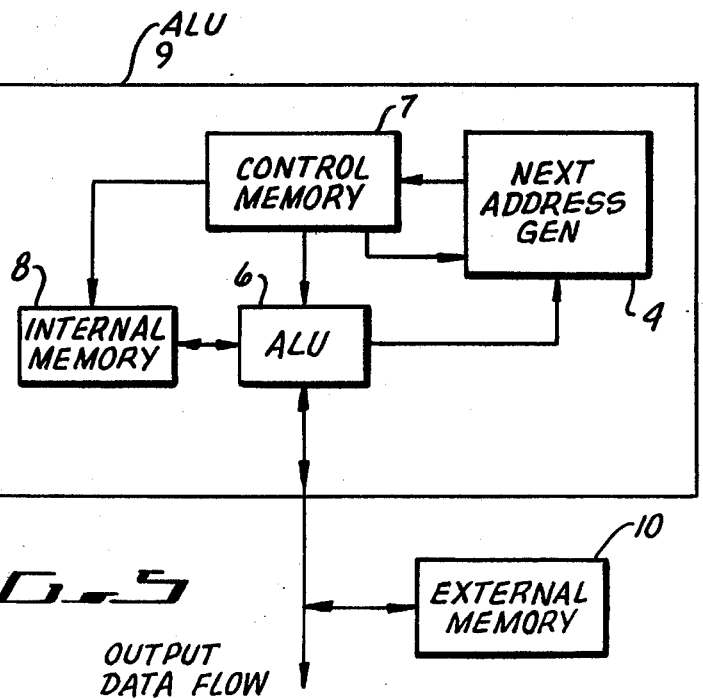
FIG. 5 is a diagram of the microprocessor and main memory.

A more complete diagram of the functional characteristics of the microprocessor in relation to its internal and external memory capability is shown in FIG. 5. Referring now to FIG. 5, the control memory 7 controls the ALU 6 (arithmetic logic unit) and the internal memory devices in any well known fashion. The next address generator 4 reacts to the control memory output in relation to the ALU output to determine the next address in control memory to be accessed. The internal memory 8 comprises registers, RAM buffers or latches to store intermediate data. The external memory 10 contains the actual pattern data which is accessed and output on demand.

Figure 6:
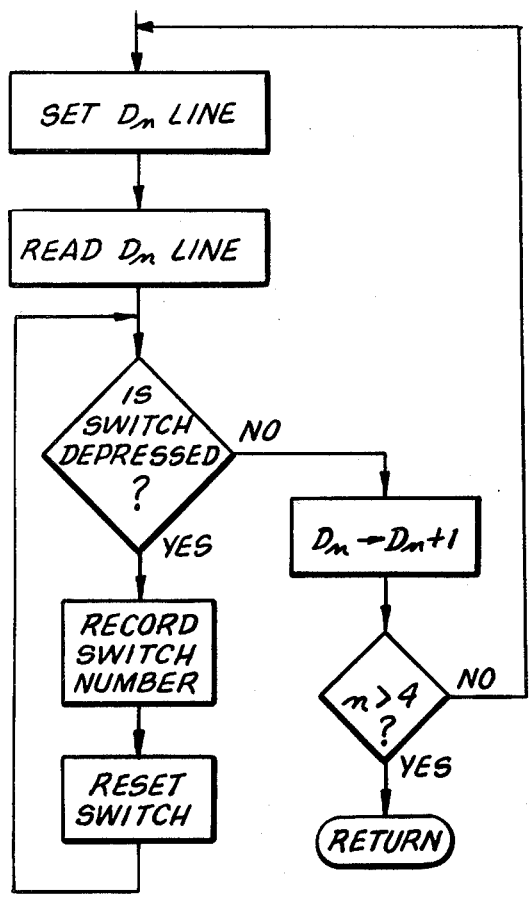
FIG. 6 is a flow chart of the switch interrogation process.

The matrix switches of FIG. 2 are read out according to the flow chart of FIG. 6. First, each $D_n$ line is interrogated by setting it low. To the extent that a switch is closed, the corresponding bit will be low. If a depressed switch is detected, its position is recorded. When the entire row has been inspected the line counter is incremented ($D_o \rightarrow D_4$) and the process repeated. When all four lines, in this example, are interrogated, the switch reading stage is completed and the appropriate data will be output.

The data output patterns are segmented into two fields, the $A_n$ field for fabric transport data and the $B_n$ field for lateral needle motion data. Each field is further divided into a pattern displacement data field, a function field and a constant field. The function field may contain any algebraic operator ($+$, $-$, $\times$, $\div$), any logical operator (OR, AND, etc.) or any other operator the ALU is adapted to provide. This function field also contains a constant to be used in conjunction with said operator. The basic displacement data patterns control the fabric and needle motion to produce any design pattern. Then, by use of the function and constant fields, the pattern can be laterally moved on the fabric, made larger, smaller, thinner, etc. Thus the provision of the function and constant fields provide another dimension of flexibility.

The basic pattern data is located in one embodiment, in external RAM. The matrix switch numbers are first translated into the addresses of the associated pattern data blocks in external memory. Next, each data word from memory is input to the microprocessor and operated on by the function and contant. Finally, the pattern is used to drive the fabric and needle motion.

Since the fabric and needle data are output in the same word, an internal mask is used to separate these portions before operating on each.

Figure 7:
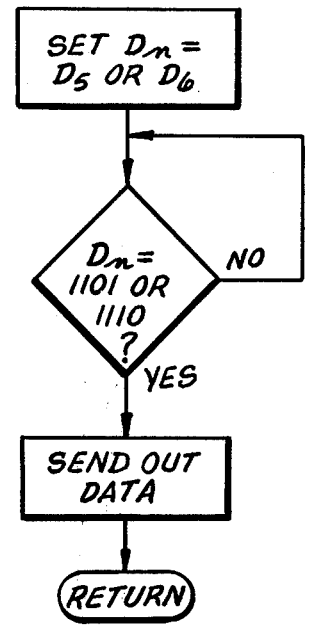
FIG. 7 is a flow chart of the synchronizer pulse generation for timing the pattern output.

The synchronization of the needle and fabric to the data pattern outputs was explained in reference to FIG. 2. The corresponding flow chart is shown in FIG. 7. The $D_5$ or $D_6$ lines are interrogated and a data pattern is not output until the IDhd n line becomes 1101 or 1110. The holes are arranged in the rotating plates of FIG. 2 so that proper timing will result. Then, through proper masking and processing, the needle or fabric signal is transmitted.

Figure 8:
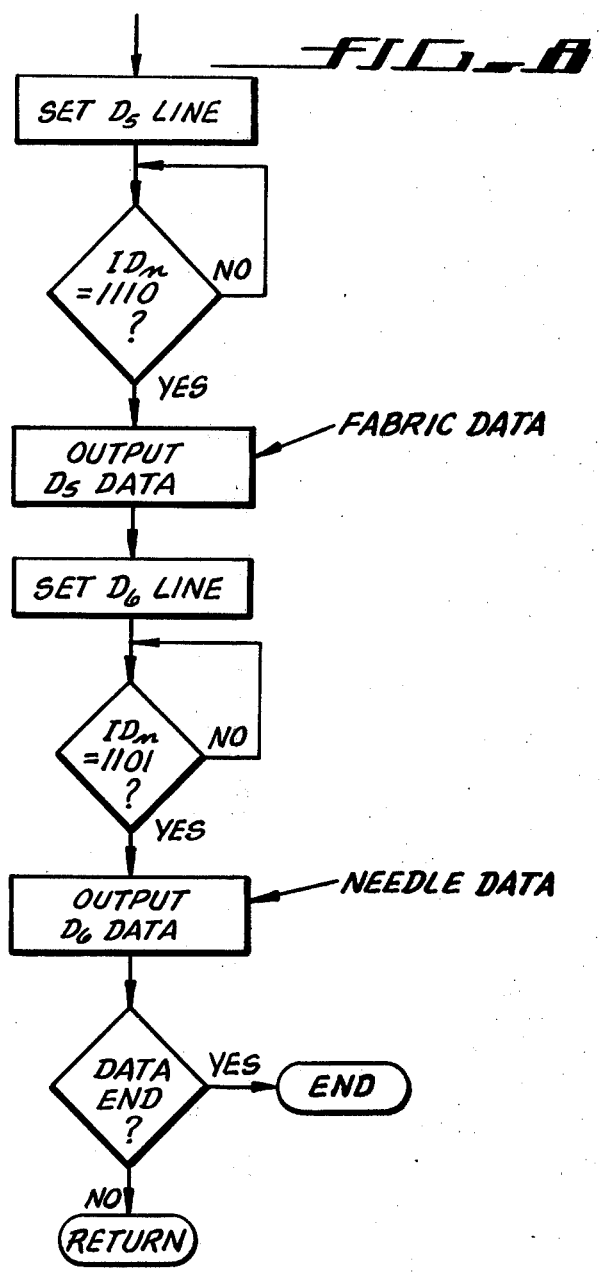
FIG. 8 is a flow chart of the pattern output.
Figure 9:
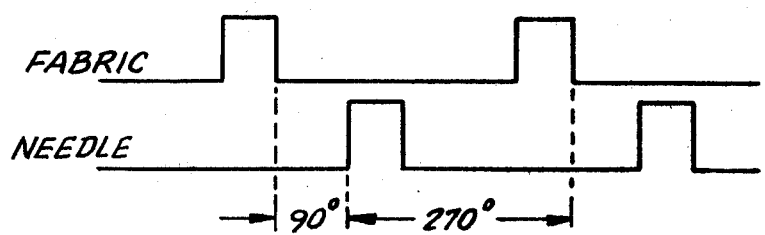
FIG. 9 is a timing chart of the needle and fabric timing pulses.

FIG. 8 is a flow chart of this process and FIG. 9 shows the timing between needle and fabric pattern signals. First, the fabric interrogate line $D_5$ is inspected. At the time of the synchronization signal, the fabric data is output. Next, the $D_6$ line is inspected and the needle data is output.

In both cases, the program waits at the decision point until the proper timing pulse presents itself. This gives the fabric motion time to be completed before the needle penetrates the fabric at its new lateral position.

Figure 10:
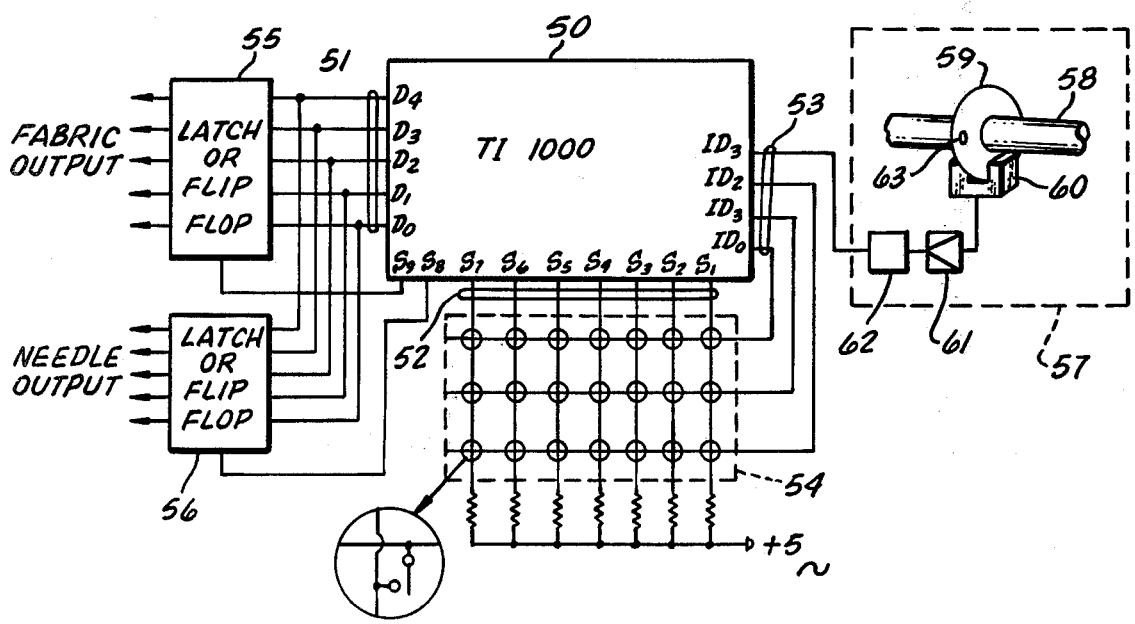
FIG. 10 is a schematic of an alternate embodiment of the microprocessor and synchronizer.

Another embodiment of this invention is shown in FIG. 10 where a one chip microprocessor 50 (a TI 1000 Series, for instance) can be used. The output lines are divided into data output lines 51 and the signal output lines 53 which drive the switch matrix 54. The matrix output goes to the microprocessor inputs $ID_o$ through $ID_3$. The switches 54 define the patterns, one time sewing, etc. The $D_o$ through $D_4$ lines, properly masked, timed and manipulated by the appropriate function and constant are output to devices 55 or 56, which store the fabric and needle patterns temporarily.

The synchronizer 57 operates as described in the text accompanying FIG. 2 producing timing pulses for the microprocessor.

While an exemplary embodiment of this invention has been described above and shown in the accompanying drawings, it is to understood that such embodiment is merely illustrative of and not restrictive on the broad invention, and that I do not wish to be limited in my invention to the specific construction or arrangement described and shown, for various obvious modifications may occur to persons having ordinary skill in the art.

What is claimed is:

1. In a sewing machine comprising servo means for receiving digital pattern data corresponding to needle and fabric positions and for moving said needle and fabric to the designated positions, apparatus for generating said digital pattern data comprising:
    a memory for storing pattern data corresponding to the fabric and needle motions required to produce a plurality of patterns,
    switch means comprising a plurality of switches for producing a plurality of digital signals, each switch corresponding to a pattern stored in said memory, and
    a microprocessor responsive to said plurality of digital signals for accessing the corresponding data patterns and for outputting said patterns to said servo means, said microprocessor further comprising means for cyclically repeating the series of patterns designated by said switch means.

2. The apparatus of claim 1 further comprising a synchronizer for generating a series of fabric timing pulses and a series of needle timing pulses; and
    wherein said microprocessor is responsive to said timing signals to output said fabric pattern data before said needle pattern data so that the fabric will have finished moving to its new position before said needle penetrates said fabric.

3. The apparatus of claim 2 wherein said synchronizer comprises:
    two circular plates rigidly tied to a rotating shaft, each plate having a hole for allowing light to pass through said hole; and
    two light emitters and light sensitive diode pairs situated so that the plate holes will pass between said emitters and diodes to produce said fabric and needle timing pulses.

4. In a sewing machine comprising servo means for receiving digital pattern data corresponding to needle positions and for moving said needle to the designated positions, apparatus for generating said digital pattern data comprising:
    a memory for storing a plurality of data words comprising a displacement field, a function field and a constant field, a plurality of switches for producing a plurality of digital signals, each switch corresponding to a word stored in said memory, and a microprocessor responsive to said plurality of digital signals for accessing the corresponding data words, producing therefrom digital pattern data by operating on the displacement field by the function field, adding the constant field thereto, and outputting the resultant digital pattern data to said servo means.

* * * * *